(12) United States Patent
Figueroa et al.

(10) Patent No.: US 9,300,226 B2
(45) Date of Patent: Mar. 29, 2016

(54) SOLAR POWER GENERATION SYSTEM (71) Applicant: TOSHIBA MITSUBISHI-ELECTRIC INDUSTRIAL SYSTEMS CORPORATION, Tokyo (JP)

(72) Inventors: Ruben Alexis Inzunza Figueroa, Tokyo (JP); Eiichi Ikawa, Tokyo (JP); Takeshi Sumiya, Tokyo (JP)

(73) Assignee: TOSHIBA MITSUBISHI-ELECTRIC INDUSTRIALS SYSTEMS CORPORATION, Tokyo (JP)

( * ) Notice: Subject to any disclaimer, the term of this patent is extended or adjusted under 35 U.S.C. 154(b) by 111 days.

(21) Appl. No.: 13/973,641

(22) Filed: Aug. 22, 2013

(65) Prior Publication Data

US 2013/0336030 A1     Dec. 19, 2013

Related U.S. Application Data

(63) Continuation of application No. PCT/JP2011/053958, filed on Feb. 23, 2011.

(51) Int. Cl.
*G05F 1/67* (2006.01)
*H02M 7/539* (2006.01)
(Continued)

(52) U.S. Cl.
CPC ............... *H02M 7/539* (2013.01); *G05F 1/67* (2013.01); *H02J 3/385* (2013.01); *H02M 1/14* (2013.01); *H02M 1/32* (2013.01); *H02M 7/5395* (2013.01); *Y02E 10/58* (2013.01)

(58) Field of Classification Search
CPC ............ G05F 1/67; Y02E 10/58; H02J 3/385; H02J 3/383; H02M 7/539; H02M 7/5395; H02M 7/53862; H02M 7/538466; H02M 1/14; H02M 1/32; H02M 7/537; H02M 7/53871
See application file for complete search history.

(56) References Cited

U.S. PATENT DOCUMENTS 6,921,985 B2      7/2005   Janssen et al.
8,547,715 B2 *   10/2013   Yuan et al. ................... 363/98
(Continued)

FOREIGN PATENT DOCUMENTS

CN          101304221 A     11/2008
CN          101777775 A      7/2010
(Continued)

OTHER PUBLICATIONS

International Preliminary Report on Patentability and Written Opinion issued by The International Bureau of WIPO on Aug. 27, 2013.

(Continued)

*Primary Examiner* — Fred E Finch, III
(74) *Attorney, Agent, or Firm* — Finnegan, Henderson, Farabow, Garrett & Dunner, LLP (57) ABSTRACT

There is provided a solar power generation system including a solar cell, an inverter converting a direct current power generated by the solar cell into an alternating current power, a system voltage measurement unit measuring a system voltage, a voltage drop detector detecting a voltage drop of a power system, based on the system voltage, a first direct current voltage controller controlling a direct current voltage of the inverter to enhance a power generation efficiency of the solar cell, when the voltage drop is not detected, and a second direct current voltage controller controlling the direct current voltage of the inverter to suppress a current output from the inverter, when the voltage drop is detected.

15 Claims, 5 Drawing Sheets

(51) Int. Cl.
*H02M 1/14* (2006.01)
*H02M 1/32* (2007.01)
*H02J 3/38* (2006.01)
*H02M 7/5395* (2006.01)

(56) References Cited

U.S. PATENT DOCUMENTS

| | | | | |
|---|---|---|---|---|
| 2001/0036093 | A1* | 11/2001 | Tanikawa | H02M 7/53871 363/37 |
| 2002/0085397 | A1* | 7/2002 | Suzui | H02J 3/383 363/37 |
| 2006/0171182 | A1* | 8/2006 | Siri | H02M 3/33592 363/131 |
| 2010/0282293 | A1* | 11/2010 | Meyer | H01L 31/02008 136/244 |
| 2010/0309692 | A1* | 12/2010 | Chisenga | H02J 3/383 363/37 |

FOREIGN PATENT DOCUMENTS

| | | |
|---|---|---|
| CN | 102082443 A | 6/2011 |
| JP | 02-217906 | 8/1990 |
| JP | 2001-136664 | 5/2001 |
| JP | 2004-328831 | 11/2004 |
| JP | 2008-059968 | 3/2008 |
| JP | 2008-228494 | 9/2008 |
| JP | 2009-165265 | 7/2009 |

OTHER PUBLICATIONS

English-language International Search Report from Japanese Patent Office for International Application No. PCT/JP2011/053958, mailed May 31, 2011.

Notification of the First Office Action from corresponding Chinese Patent Application No. 201180068310.1 mailed Mar. 23, 2015.

* cited by examiner

SOLAR POWER GENERATION SYSTEM

CROSS REFERENCE TO RELATED APPLICATIONS

This application is a Continuation Application of PCT Application No. PCT/JP2011/053958, filed Feb. 23, 2011, the entire contents of which are incorporated herein by reference.

BACKGROUND OF THE INVENTION

1. Field of the Invention

The invention relates to a solar power generation system which interconnects with an alternating current power system.

2. Description of the Related Art

In general, an inverter is used in a solar power generation system to interconnect with an alternating current (AC) power system. The inverter converts a direct current (DC) power generated by a solar cell into an AC power which synchronizes with the AC power system, to supply the power to the AC power system. Moreover, on an AC output side of the inverter, an overcurrent relay is disposed to protect the inverter.

However, the overcurrent relay for use in this way performs the following false operation sometimes. When a system voltage drops owing to a fault or the like of the AC power system, an amplitude of a ripple of an alternating current output from the inverter increases. In consequence, even when an instantaneous value of a current of a fundamental component is not in excess of a setting value at which the overcurrent relay operates, the instantaneous value due to the amplitude of the ripple of the current exceeds the setting value, so that the overcurrent relay operates sometimes. In this case, the overcurrent relay is to bring about a false operation.

CITATION LIST

Patent Literature

Patent Literature 1: U.S. Pat. No. 6,921,985

BRIEF SUMMARY OF THE INVENTION

An object of the invention is to provide a solar power generation system which interconnects with an AC power system and which can prevent a false operation of an overcurrent relay disposed on the side of the AC power system.

In accordance with an aspect of the invention, there is provided a solar power generation system that interconnects with an alternating current power system. The solar power generation system includes a solar cell; an inverter configured to convert a direct current power generated by the solar cell into an alternating current power; a system voltage measurement unit configured to measure a system voltage of the alternating current power system; a voltage drop detector configured to detect a voltage drop of the alternating current power system, based on the system voltage measured by the system voltage measurement unit; a first direct current voltage controller configured to control a direct current voltage of the inverter to enhance a power generation efficiency of the solar cell, when the voltage drop is not detected by the voltage drop detector; and a second direct current voltage controller configured to control the direct current voltage of the inverter to suppress a current output from the inverter, when the voltage drop is detected by the voltage drop detector.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, embodiments of the invention will be described with reference to the drawings.

First Embodiment

Figure 1:
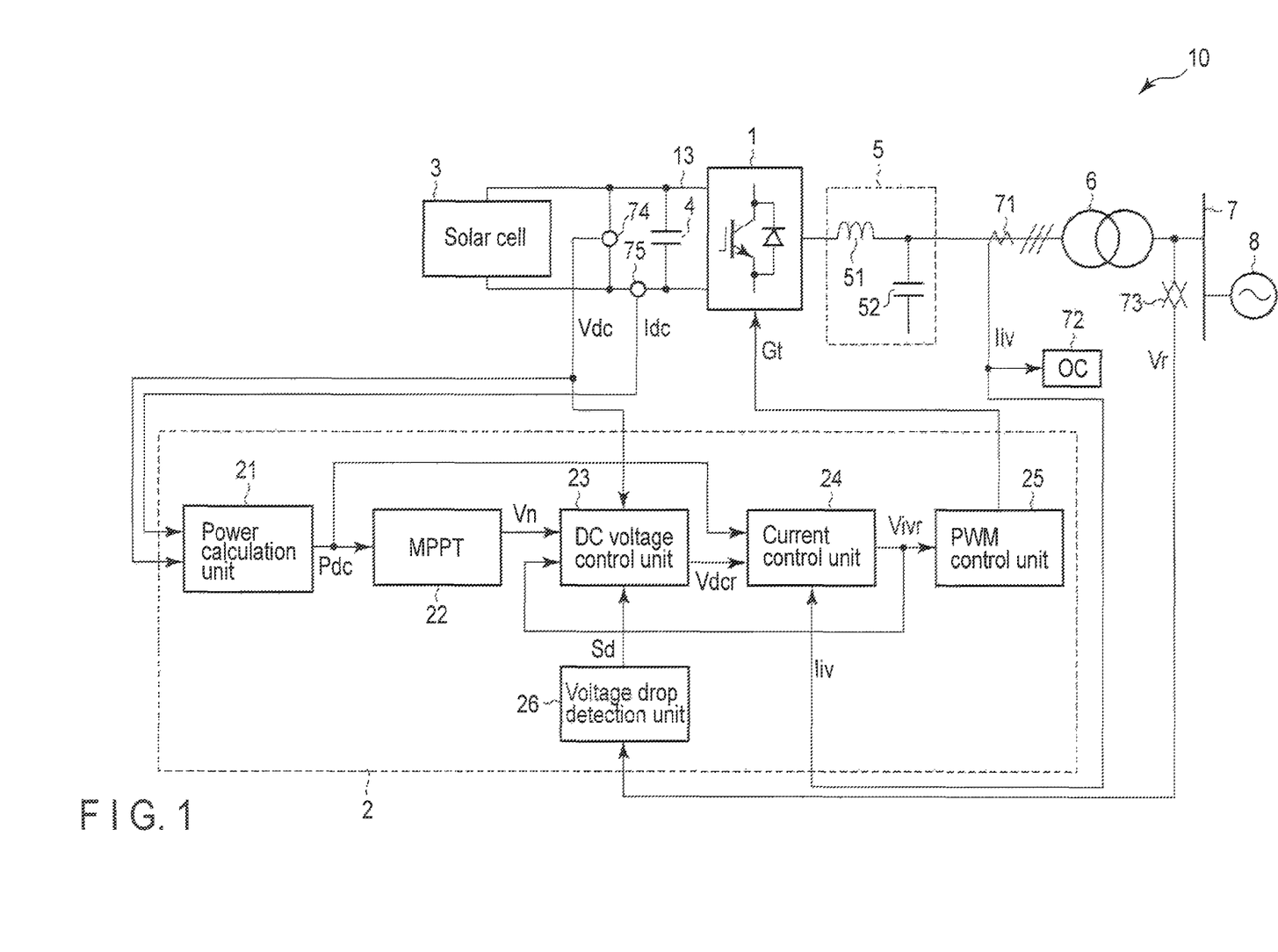
FIG. 1 is a block diagram showing a constitution of a solar power generation system to which a control apparatus of an inverter according to a first embodiment of the invention is applied.

FIG. 1 is a block diagram showing a constitution of a solar power generation system 10 to which a control apparatus 2 of an inverter 1 according to a first embodiment of the invention is applied. It is to be noted that the same parts as in the drawings are denoted with like reference signs to omit detailed description of the parts, and different parts will mainly be described. Also in the subsequent embodiments, repeated descriptions are similarly omitted.

The solar power generation system 10 comprises the inverter 1, the control apparatus 2, a solar cell 3, a smoothing capacitor 4, an AC filter 5, an interconnection transformer 6, an AC current detector 71, an overcurrent relay 72, an AC voltage detector 73, and a DC voltage detector 74. The solar power generation system 10 is a dispersed generation system which interconnects with an AC power system including a system bus 7 and an AC power source 8.

The solar cell 3 is a cell which generates power by sunlight energy. The solar cell 3 supplies the generated DC power to the inverter 1.

The inverter 1 is an inverter subjected to pulse width modulation (PWM) control. The inverter 1 converts the DC power supplied from the DC power source 3 into the AC power which synchronizes with the AC power source 8. The inverter 1 supplies the AC power to the system bus 7 connected to the AC power source 8, via the interconnection transformer 6. In the inverter 1, a power conversion circuit (an inverter circuit) is constituted of a switching element. The switching element is driven by a gate signal Gt output from the control apparatus 2. In consequence, the inverter 1 performs the power conversion.

The smoothing capacitor 4 is disposed on a DC side of the inverter 1. The smoothing capacitor 4 smoothes the DC power supplied from the solar cell 3 to the inverter 1.

The AC filter 5 comprises a reactor 51 and a capacitor 52. The AC filter 5 removes a noise output from the inverter 1.

The AC current detector 71 is a detector to measure an output current Iiv of the inverter 1. The AC current detector 71 outputs the detected output current Iiv as a detection signal to the control apparatus 2 and the overcurrent relay 72.

The overcurrent relay 72 performs a protecting operation, when an instantaneous value of the output current Iiv measured by the AC current detector 71 is in excess of a beforehand setting value.

The AC voltage detector 73 is a detector to measure a system voltage Vr of the system bus 7. The AC voltage detector 73 outputs the detected system voltage Vr as a detection signal to the control apparatus 2.

The DC voltage detector 74 is a detector to measure a DC voltage Vdc which is to be applied to the DC side of the inverter 1. The DC voltage detector 74 outputs the detected DC voltage Vdc as a detection signal to the control apparatus 2.

A DC current detector 75 is a detector to measure a direct current Idc which is to be input into the DC side of the inverter 1. The DC current detector 75 outputs a detected direct current Idc as a detection signal to the control apparatus 2.

The control apparatus 2 comprises a power calculation unit 21, a maximum power point tracking (MPPT) 22, a DC voltage control unit 23, a current control unit 24, a PWM control unit 25, and a voltage drop detection unit 26.

The power calculation unit 21 calculates a DC power Pdc on the basis of the DC voltage Vdc detected by the DC voltage detector 74 and the direct current Idc detected by the DC current detector 75. The power calculation unit 21 outputs the calculated DC power Pdc to the MPPT 22.

The MPPT 22 outputs, to the DC voltage control unit 23, a voltage increase/decrease signal Vn indicating one of increase and decrease of the DC voltage, on the basis of the DC power Pdc calculated by the power calculation unit 21.

Figure 2:
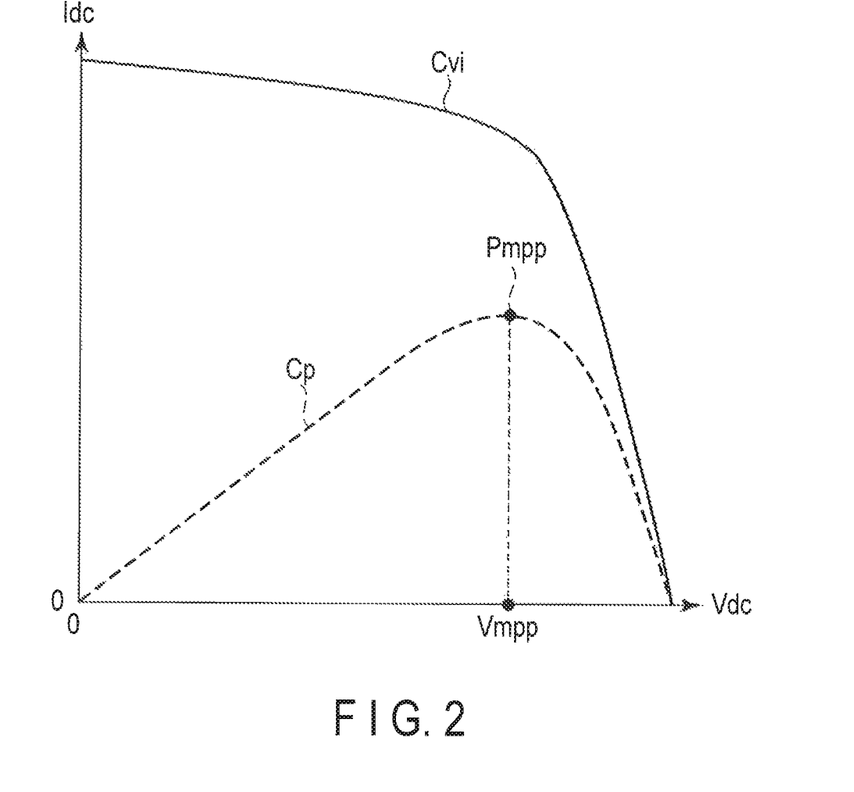
FIG. 2 is a characteristic diagram showing characteristics of power generation by a solar cell according to the first embodiment.

Control of the DC voltage Vdc by the MPPT 22 will be described with reference to FIG. 2. FIG. 2 is a characteristic diagram showing characteristics of the power generation by the solar cell 3 according to the present embodiment. A curve Cvi is a curve indicating a voltage-current correlation in the power generation by the solar cell 3. A curve Cp is a curve indicating characteristics of the power in the power generation by the solar cell 3.

The MPPT 22 performs control to search for a voltage (maximum power point voltage) Vmpp of a maximum power point Pmmp which is the maximum power in the curve Cp shown in FIG. 2. Specifically, the control is as follows.

First, the DC voltage Vdc is controlled to a certain suitable voltage value. The MPPT 22 measures the DC power Pdc at this voltage.

Next, the MPPT 22 outputs the voltage increase/decrease signal Vn to raise (or lower) the DC voltage Vdc as much as a predetermined voltage for one stage. In consequence, the DC voltage is slightly raised (or lowered) by the control of the DC voltage control unit 23.

The MPPT 22 measures the raised (or lowered) DC power Pdc. The MPPT 22 compares the previously measured DC power Pdc with the DC power Pdc newly measured this time.

When the DC power Pdc newly measured this time is larger, the MPPT 22 outputs the voltage increase/decrease signal Vn indicating the same direction as the previous direction. That is, when the previous voltage increase/decrease signal Vn is the signal to raise the voltage, the voltage increase/decrease signal Vn is output as the signal to raise the voltage also this time. When the previous voltage increase/decrease signal Vn is the signal to lower the voltage, the voltage increase/decrease signal Vn is output as the signal to lower the voltage also this time.

When the DC power Pdc newly measured this time is smaller, the MPPT 22 outputs the voltage increase/decrease signal Vn which is different from the previous signal. That is, when the previous voltage increase/decrease signal Vn is the signal to raise the voltage, the voltage increase/decrease signal Vn is output as the signal to lower the voltage this time. When the previous voltage increase/decrease signal Vn is the signal to lower the voltage, the voltage increase/decrease signal Vn is output as the signal to raise the voltage this time.

The MPPT 22 repeats the above procedure to perform the control so that the DC voltage Vdc is always in the vicinity of the maximum power point voltage Vmpp.

Into the voltage drop detection unit 26, the system voltage Vr detected by the AC voltage detector 73 is input. The voltage drop detection unit 26 outputs a detection signal Sd to the DC voltage control unit 23 on the basis of the system voltage Vr. The voltage drop detection unit 26 sets the detection signal Sd to "0", when the system voltage Vr is not less than a predetermined reference voltage (usual time). The voltage drop detection unit 26 sets the detection signal Sd to "1", when the system voltage Vr is below the predetermined reference voltage (at the drop of the system voltage Vr).

Into the DC voltage control unit 23, there are input the DC voltage Vdc detected by the DC voltage detector 74, the voltage increase/decrease signal Vn output from the MPPT 22, the detection signal Sd output from the voltage drop detection unit 26, and a voltage command value Vivr calculated by the current control unit 24. The DC voltage control unit 23 performs the control of the DC voltage Vdc at the usual time by the MPPT 22, when the detection signal Sd is "0". The DC voltage control unit 23 performs the control of the DC voltage Vdc at the drop of the system voltage Vr, when the detection signal Sd is "1". The DC voltage control unit 23 calculates a DC voltage command value Vdcr to control the DC voltage Vdc. The DC voltage control unit 23 outputs the calculated DC voltage command value Vdcr to the current control unit 24.

Into the current control unit 24, there are input the output current Iiv detected by the AC current detector 71, the DC power Pdc calculated by the power calculation unit 21, and the DC voltage command value Vdcr calculated by the DC voltage control unit 23. The current control unit 24 calculates a voltage command value Vivr to control an output voltage of the inverter 1, on the basis of the output current Iiv, the DC power Pdc, and the DC voltage command value Vdcr. The current control unit 24 outputs the calculated voltage command value Vivr to the PWM control unit 25.

Into the PWM control unit 25, the voltage command value Vivr calculated by the current control unit 24 is input. The PWM control unit 25 generates the gate signal Gt so that the output voltage of the inverter 1 is controlled to the voltage command value Vivr. The gate signal Gt drives the switching element of the inverter 1. In consequence, the inverter 1 is subjected to PWM control.

Figure 3:
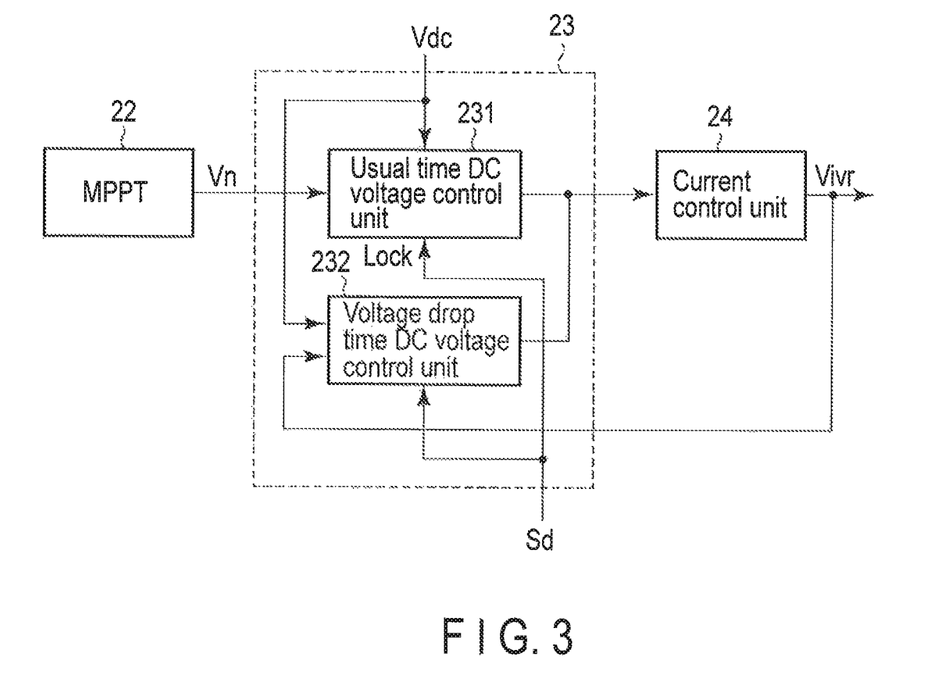
FIG. 3 is a block diagram showing a constitution of a DC voltage control unit according to the first embodiment.

FIG. 3 is a block diagram showing a constitution of the DC voltage control unit 23 according to the present embodiment.

The DC voltage control unit 23 comprises a usual time DC voltage control unit 231 and a voltage drop time DC voltage control unit 232. When the detection signal Sd is "0", the DC voltage Vdc is controlled by the usual time DC voltage control unit 231. When the detection signal Sd is "1", the DC voltage Vdc is controlled by the voltage drop time DC voltage control unit 232.

Into the usual time DC voltage control unit 231, there are input the DC voltage Vdc detected by the DC voltage detector 74, the voltage increase/decrease signal Vn output from the MPPT 22, and the detection signal Sd output from the voltage drop detection unit 26. On receiving the detection signal Sd indicating "1", the usual time DC voltage control unit 231 stops the control. At this time, the usual time DC voltage control unit 231 retains the DC voltage command value Vdcr output just before the stop. On receiving the detection signal Sd indicating "0", the usual time DC voltage control unit 231 starts the control. At this time, the DC voltage command value Vdcr retained at the stop of the control is output. Afterward, the usual time DC voltage control unit 231 controls the DC voltage Vdc in accordance with the above-mentioned control by the MPPT 22.

Into the voltage drop time DC voltage control unit 232, there are input the DC voltage Vdc detected by the DC voltage detector 74, the detection signal Sd output from the voltage drop detection unit 26, and the voltage command value Vivr calculated by the current control unit 24. On receiving the detection signal Sd indicating "1", the voltage drop time DC voltage control unit 232 starts the control. On receiving the detection signal Sd indicating "0", the voltage drop time DC voltage control unit 232 stops the control.

The voltage drop time DC voltage control unit 232 calculates the DC voltage command value Vdcr to raise the DC voltage Vdc so that a ripple of the output current Iiv of the inverter 1 does not exceed the setting value of the overcurrent relay 72, on the basis of the voltage command value Vivr calculated by the current control unit 24. That is, the voltage drop time DC voltage control unit 232 continues to raise the DC voltage Vdc until the output current Iiv of the inverter 1 becomes a value which is not more than a predetermined value. As shown in FIG. 2, when the DC voltage Vdc is raised in excess of the maximum power point voltage Vmpp, the direct current Idc decreases. After the output current Iiv of the inverter 1 becomes the value which is not more than the predetermined value, the voltage drop time DC voltage control unit 232 maintains the DC voltage Vdc during the drop of the system voltage Vr.

According to the present embodiment, when the system voltage Vr of the interconnecting power system drops, the control to raise the DC voltage Vdc is performed. In consequence, the direct current Idc to be input into the inverter 1 decreases. Therefore, the output current Iiv of the inverter 1 also decreases. In consequence, it is possible to prevent a false operation of the overcurrent relay 72 due to the ripple of the output current Iiv of the inverter 1. Moreover, at the usual time, the control of the DC voltage Vdc by the MPPT 22 is performed, so that a power generation efficiency of the solar cell 3 can be maximized.

Second Embodiment

Figure 4:
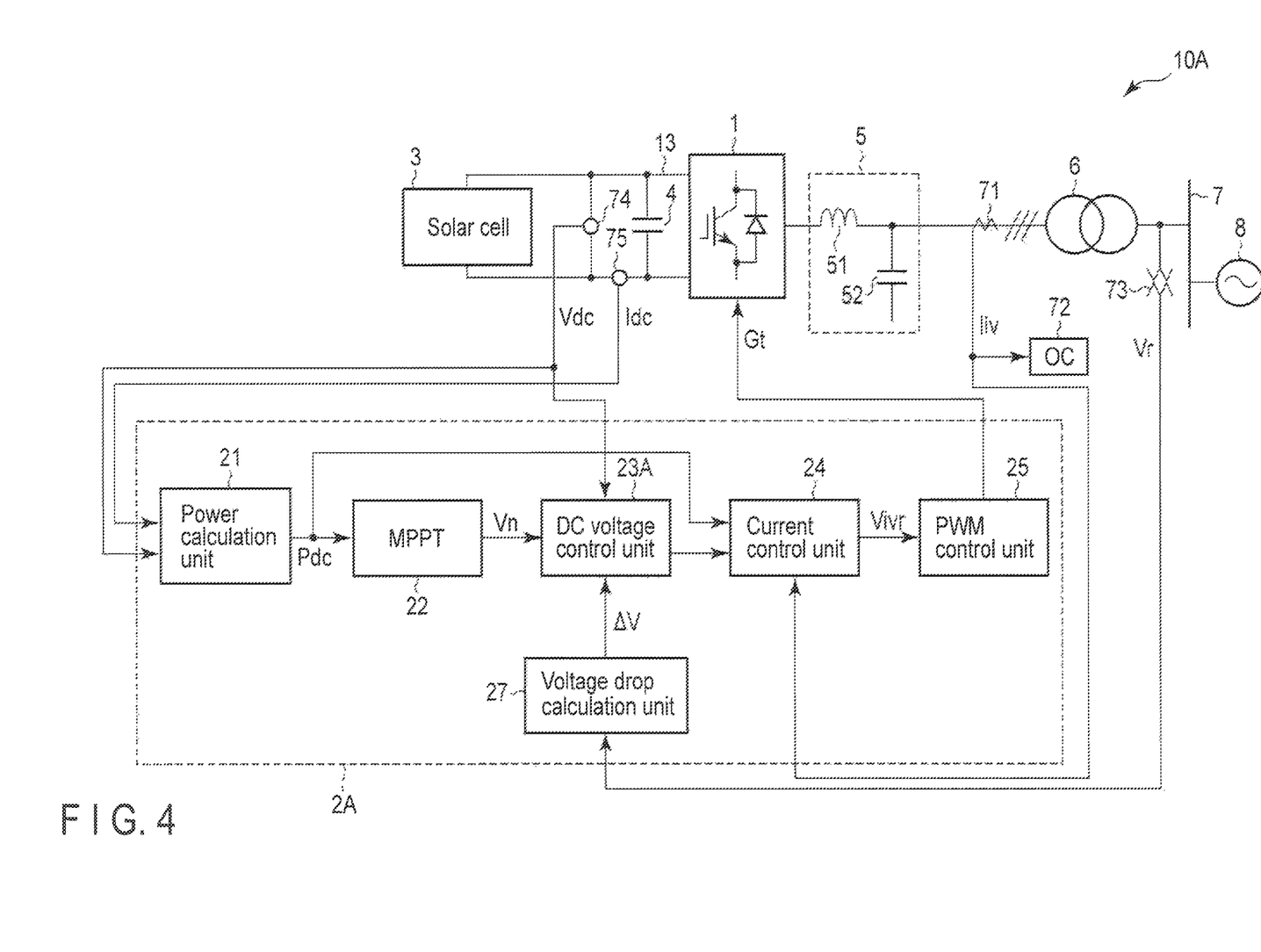
FIG. 4 is a block diagram showing a constitution of a solar power generation system to which a control apparatus of an inverter according to a second embodiment of the invention is applied.

FIG. 4 is a block diagram showing a constitution of a solar power generation system 10A to which a control apparatus 2A of an inverter 1 according to a second embodiment of the invention is applied.

The solar power generation system 10A has a constitution where in the solar power generation system 10 according to the first embodiment shown in FIG. 1, the control apparatus 2 is replaced with the control apparatus 2A. The other aspects are similar to those of the solar power generation system 10 according to the first embodiment.

The control apparatus 2A has a constitution where in the control apparatus 2 according to the first embodiment, the DC voltage control unit 23 is replaced with a DC voltage control unit 23A and the voltage drop detection unit 26 is replaced with a voltage drop calculation unit 27. The other aspects are similar to those of the control apparatus 2 according to the first embodiment.

Into the voltage drop calculation unit 27, a system voltage Vr detected by an AC voltage detector 73 is input. When the system voltage Vr is below a predetermined reference voltage (at the drop of the system voltage Vr), the voltage drop calculation unit 27 calculates a voltage drop $\Delta V$ by subtracting the system voltage Vr from a rated voltage. The voltage drop calculation unit 27 outputs the calculated voltage drop $\Delta V$ to the DC voltage control unit 23A.

Figure 5:
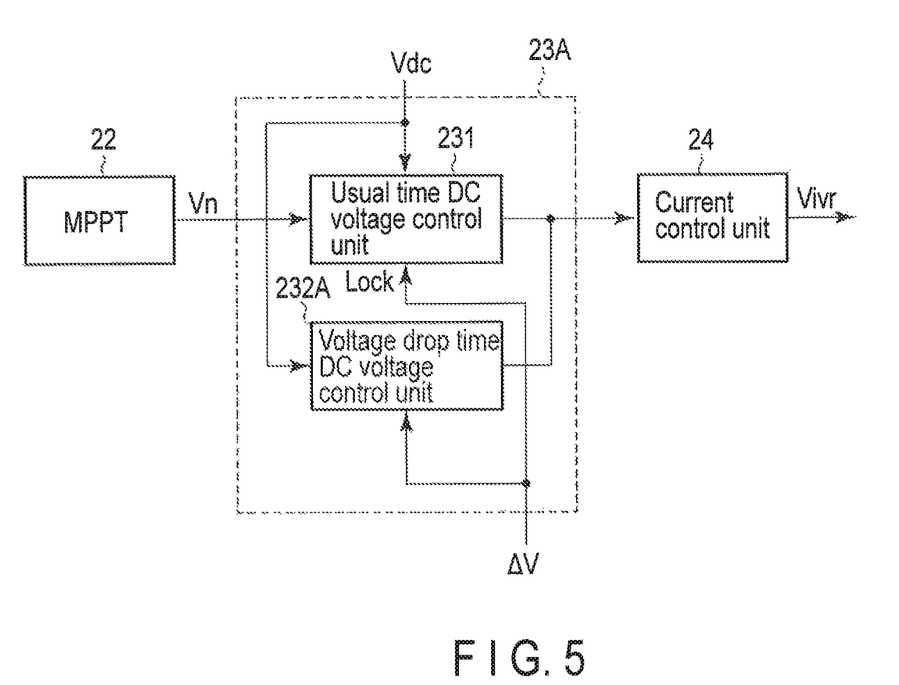
FIG. 5 is a block diagram showing a constitution of a DC voltage control unit according to the second embodiment.

FIG. 5 is a block diagram showing a constitution of the DC voltage control unit 23A according to the present embodiment.

The DC voltage control unit 23A has a constitution where in the DC voltage control unit 23 according to the first embodiment shown in FIG. 3, the voltage drop time DC voltage control unit 232 is replaced with a voltage drop time DC voltage control unit 232A. The other aspects are similar to those of the DC voltage control unit 23 according to the first embodiment. It is to be noted that in a usual time DC voltage control unit 231 according to the present embodiment, the time when the detection signal Sd is "0" according to the first embodiment corresponds to a time when the voltage drop $\Delta V$ is "0" (or a time when the voltage drop $\Delta V$ is not calculated), and the time when the detection signal Sd is "1" according to the first embodiment corresponds to a time when the voltage drop $\Delta V$ is not "0".

Into the voltage drop time DC voltage control unit 232A, there are input a DC voltage Vdc detected by a DC voltage detector 74 and the voltage drop $\Delta V$ calculated by the voltage drop calculation unit 27. The voltage drop time DC voltage control unit 232A starts control, when the voltage drop $\Delta V$ is not "0" (at the drop of the system voltage Vr). The voltage drop time DC voltage control unit 232A stops the control, when the voltage drop $\Delta V$ is "0" (usual time).

At the drop of the system voltage Vr, the voltage drop time DC voltage control unit 232A calculates a DC voltage command value Vdcr on the basis of the voltage drop $\Delta V$. The voltage drop time DC voltage control unit 232A performs the calculation so that the larger the voltage drop $\Delta V$ is, the larger the DC voltage command value Vdcr becomes. That is, the voltage drop time DC voltage control unit 232A noticeably raises the DC voltage Vdc, as the voltage drop $\Delta V$ increases. In consequence, the voltage drop time DC voltage control unit 232A decreases an output current Iiv of the inverter 1 in accordance with the voltage drop $\Delta V$.

Next, a calculation method of the DC voltage command value Vdcr at the drop of the system voltage Vr will be described.

A current ripple to be superimposed on the output current Iiv of the inverter 1 is generated in accordance with the following equation.

$$di/dt = \Delta V/L \qquad (1)$$

in which the left side is a change ratio of the output current Iiv of the inverter 1. L is a reactor component between the inverter 1 and a system bus 7. $\Delta V$ is the voltage drop of the system voltage Vr.

The DC voltage command value Vdcr is set so that the current ripple predicted in accordance with the above equation is suppressed.

According to the present embodiment, the control to raise the DC voltage Vdc is performed in accordance with the voltage drop ΔV of the system voltage Vr. Therefore, a function and an effect similar to those of the first embodiment can be obtained.

It is to be noted that in the respective embodiments, the DC voltage Vdc of the inverter 1 is raised to suppress the output current Iiv of the inverter 1, but the control may be performed so that the DC voltage Vdc is lowered to suppress the output current Iiv. When the DC voltage Vdc is controlled so that the maximum power point voltage Vmpp shown in FIG. 2 is excluded, the control to suppress the output current Iiv can be performed. In consequence, a function and an effect similar to those of each embodiment can be obtained.

Moreover, in the second embodiment, an equation to obtain the DC voltage command value Vdcr at the drop of the system voltage Vr may not be based on the above equation (1). For example, the equation to obtain the DC voltage command value Vdcr may be obtained by empirical rule or know-how.

Furthermore, in the respective embodiments, the interconnection transformer 6 interposed between the solar power generation system 10 and the AC power system may not be disposed. In this case, the voltage detected by the AC voltage detector 73 is an electricity at the same measuring position as that of the current detected by the AC current detector 71.

It is to be noted that the present invention is not restricted to the foregoing embodiments, and constituent elements can be modified and changed into shapes without departing from the scope of the invention at an embodying stage. Additionally, various inventions can be formed by appropriately combining a plurality of constituent elements disclosed in the foregoing embodiments. For example, several constituent elements may be eliminated from all constituent elements disclosed in the embodiments. Furthermore, constituent elements in the different embodiments may be appropriately combined.

What is claimed is:

1. A solar power generation system that interconnects with an alternating current power system, the solar power generation system comprising:
    a solar cell;
    an inverter configured to convert a direct current power generated by the solar cell into an alternating current power;
    a system voltage measurement unit configured to measure a system voltage of the alternating current power system;
    a voltage drop detector configured to detect a voltage drop of the alternating current power system, based on the system voltage measured by the system voltage measurement unit;
    a first direct current voltage controller configured to control a direct current voltage of the inverter such that the power generated by the solar cell is at a maximum power point, when the voltage drop is not detected by the voltage drop detector; and
    a second direct current voltage controller configured to control the direct current voltage of the inverter such that a ripple of a current output from the inverter is less than a setting value of an overcurrent relay provided on an output side of the inverter, when the voltage drop is detected by the voltage drop detector.

2. The solar power generation system according to claim 1, wherein the second direct current voltage controller is configured to perform control to raise the direct current voltage of the inverter, when the voltage drop is detected by the voltage drop detector.

3. The solar power generation system according to claim 2, wherein the second direct current voltage controller is configured to change a voltage to raise the direct current voltage of the inverter in accordance with the voltage drop, when the voltage drop is detected by the voltage drop detector.

4. The solar power generation system according to claim 1, wherein the second direct current voltage controller is configured to perform control to lower the direct current voltage of the inverter, when the voltage drop is detected by the voltage drop detector.

5. The solar power generation system according to claim 4, wherein the second direct current voltage controller is configured to change a voltage to lower the direct current voltage of the inverter in accordance with the voltage drop, when the voltage drop is detected by the voltage drop detector.

6. A control apparatus for an inverter that controls the inverter to be applied to a solar power generation system interconnecting with an alternating current power system and including a solar cell, the control apparatus comprising:
    a system voltage measurement unit configured to measure a system voltage of the alternating current power system;
    a voltage drop detector configured to detect a voltage drop of the alternating current power system, based on the system voltage measured by the system voltage measurement unit;
    a first direct current voltage controller configured to control a direct current voltage of the inverter such that the power generated by the solar cell is at a maximum power point, when the voltage drop is not detected by the voltage drop detector; and
    a second direct current voltage controller configured to control the direct current voltage of the inverter such that a ripple of a current output from the inverter is less than a setting value of an overcurrent relay provided on an output side of the inverter, when the voltage drop is detected by the voltage drop detector.

7. The control apparatus for the inverter according to claim 6, wherein the second direct current voltage controller is configured to perform control to raise the direct current voltage of the inverter, when the voltage drop is detected by the voltage drop detector.

8. The control apparatus for the inverter according to claim 7, wherein the second direct current voltage controller is configured to change a voltage to raise the direct current voltage of the inverter in accordance with the voltage drop, when the voltage drop is detected by the voltage drop detector.

9. The control apparatus for the inverter according to claim 6, wherein the second direct current voltage controller is configured to perform control to lower the direct current voltage of the inverter, when the voltage drop is detected by the voltage drop detector.

10. The control apparatus for the inverter according to claim 9, wherein the second direct current voltage controller is configured to change a voltage to lower the direct current voltage of the inverter in accordance with the voltage drop, when the voltage drop is detected by the voltage drop detector.

11. A control method for an inverter that controls the inverter to be applied to a solar power generation system interconnecting with an alternating current power system and including a solar cell, the control method comprising:

measuring a system voltage of the alternating current power system;

detecting a voltage drop of the alternating current power system, based on the measured system voltage;

controlling a direct current voltage of the inverter such that the power generated by the solar cell is at a maximum power point, when the voltage drop of the alternating current power system is not detected; and controlling the direct current voltage of the inverter such that a ripple of a current output from the inverter is less than a setting value of an overcurrent relay provided on an output side of the inverter, when the voltage drop of the alternating current power system is detected.

12. The control method for the inverter according to claim 11, wherein when the voltage drop of the alternating current power system is detected, control is performed to raise the direct current voltage of the inverter.

13. The control method for the inverter according to claim 12, wherein when the voltage drop of the alternating current power system is detected, a voltage to raise the direct current voltage of the inverter is changed in accordance with the voltage drop.

14. The control method for the inverter according to claim 11, wherein when the voltage drop of the alternating current power system is detected, control to lower the direct current voltage of the inverter is performed.

15. The control method for the inverter according to claim 14, wherein when the voltage drop of the alternating current power system is detected, a voltage to lower the direct current voltage of the inverter is changed in accordance with the voltage drop.

* * * * *